United States Patent [19]
Ge et al.

[11] Patent Number: 6,124,858
[45] Date of Patent: *Sep. 26, 2000

[54] RASTER IMAGE MAPPING

[75] Inventors: Grace Ge; Glenn G. Gilley; Wei Huang, all of Mtn. View; David R. Lazarony, Jr., San Jose, all of Calif.; Brice W. Tebbs, Chapel Hill, N.C.

[73] Assignee: Adobe Systems Incorporated, San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/837,158

[22] Filed: Apr. 14, 1997

[51] Int. Cl.$^7$ .................................................. G06T 11/40
[52] U.S. Cl. ............................ 345/425; 345/427
[58] Field of Search ..................... 345/419, 425, 345/430, 442, 340, 431, 434, 427

[56] References Cited

U.S. PATENT DOCUMENTS

| | | | |
|---|---|---|---|
| 4,888,713 | 12/1989 | Falk | 364/522 |
| 4,935,879 | 6/1990 | Ueda | 345/430 |
| 5,012,433 | 4/1991 | Callahan et al. | 364/518 |
| 5,255,352 | 10/1993 | Falk | 345/425 |
| 5,303,334 | 4/1994 | Snyder et al. | 395/109 |
| 5,333,245 | 7/1994 | Verchione | 395/130 |
| 5,369,736 | 11/1994 | Kato et al. | 395/125 |
| 5,537,638 | 7/1996 | Morita et al. | 345/425 |
| 5,544,291 | 8/1996 | Gilley et al. | 395/123 |
| 5,673,377 | 9/1997 | Berkaloff | 345/430 |
| 5,701,403 | 12/1997 | Watanabe et al. | 345/419 |
| 5,767,858 | 6/1998 | Kawase et al. | 345/430 |
| 5,793,372 | 8/1998 | Binns et al. | 345/419 |
| 5,903,277 | 5/1999 | Sutherland et al. | 345/431 |

FOREIGN PATENT DOCUMENTS 0 380 459 A2  8/1990  European Pat. Off. .
0 637 814 A2  2/1995  European Pat. Off. .
WO 97/45782  12/1997  WIPO .

OTHER PUBLICATIONS

Heckbert, "Survey of texture mapping", IEEE Computer Graphics and Applications, vol. 6. No. 11, nov. 1986, pp. 56–67.

George Wolberg, "Digital Image Warping," *IEEE Computer Society Press*, Los Alamitos, CA 1990, pp. 41–94.

Gershon Elbert et al., "Hiden Curve Removal for Free form Ssurfaces," *Computer Graphics*, vol.24, No. 4, Aug. 1990, pp.95–104.

J.D.Foley et al., "Principles and Practice", *Computer Graphics* 2nd edition, Addison–Wesley, 1993, pp. 741–744.

Primary Examiner—Raymond J. Bayerl
Assistant Examiner—Tadesse Hailu
Attorney, Agent, or Firm—Fish & Richardson P.C.

[57] ABSTRACT

Method and apparatus rendering a two-dimensional resolution-dependent raster image as applied to a three-dimensional surface modeled object. The rendering may be performed by digital electronics, a programmed computer processor, or a combination of them. Rendering includes mapping the 2-D raster image to a portion of a 2-D parametric map of a 3-D object, rendering the 3-D object as a 2-D vector resolution-independent output, and mapping the mapped raster image from the 2-D parametric map to a 2-D output space. Embodiments may include one or more of the following features. The raster and vector output is mapped to a 2-D display space. A clipping path is established for the raster image and mapped to the 2-D parametric map and to the 2-D display space. The raster image is edited and masked while displayed on a display of the 2-D parametric map. The vector output and raster output are integrated to generate a final output including both vector and raster data. The final output is sent to a printing device and rasterized by the printing device.

17 Claims, 8 Drawing Sheets

RASTER IMAGE MAPPING

This invention relates to computer graphics and, more particularly, to a method of mapping a two-dimensional raster based image onto surfaces of a three-dimensional vector based image model.

BACKGROUND

Computer graphics software and technology is used to creates visual images from digital data. Images may be created in two dimensions (2-D) or, alternatively, images may be generated from object models defined in three dimensions (3-D).

Two dimensional images may be created and stored as either resolution-dependent raster images or as resolution-independent vector images. Raster images are composed of a predetermined number of picture elements (pixels). The level of detail in a raster image is determined by the number of pixels in the image and is therefore limited when the image is created. Alternatively, two dimensional images may be stored as vector images. Vector images are created and stored as resolution-independent mathematically defined lines and curves. Prior to printing or display, a 2-D rendering process converts the mathematically defined lines and curves to pixels. Vector image 2-D rendering may be accomplished by software in the computer system or may be accomplished by software residing in the display device, such as by a PostScript™ interpreter in a laser printer.

Three dimensional models may also be used to create graphic images. Three dimensional resolution-dependent models may be created using a 3-D array of discrete volume elements known as voxels. The level of detail in a voxel based 3-D model is determined by the number of discrete voxel elements and generally cannot be increased. Voxel based 3-D models are not further addressed in this disclosure.

Three dimensional models may also be created in a resolution-independent format. Resolution-independent 3-D models may be stored as parametric surfaces mathematically defined on x, y, and z axes, alternatively, polygon based surface models in which modeled object surfaces are approximated by many small polygonal facets may be used, still other modeling alternatives include, for example, non polygon-based models as well as alternative coordinate systems, such as polar coordinate systems.

To print or display a 3-D model, a 3-D rendering process is used to create a 2-D view of 3-D object surfaces as if the object were being viewed from a particular point in 3-D space. The 3-D rendering process may be either resolution-dependent or resolution-independent. Resolution-dependent rendering produces a 2-D view having a fixed number of pixels. Resolution-dependent 3-D rendering is described in, for example, Foley, et al., *Computer Graphics: Principles and Practice,* 2nd ed., Addison Wesley Publishing company, 1990, ISBN 0-201-12110-7. Alternatively, 3-D rendering may be resolution-independent. Resolution-independent 3-D rendering produces a 2-D vector image view of the modeled object. A 2-D rendering process is subsequently used to enable printing or display of the produced 2-D vector image. Resolution independent 3-D rendering is provided by software products such as Adobe Dimensions 2.0™ and is described in U.S. Pat. No. 5,544,291 entitled Resolution-Independent Method For Displaying a Three Dimensional Model in Two-Dimensional Display Space.

During 3-D rendering, details may be added to rendered 3-D model surfaces by use of image mapping techniques. Mapping of 2-D raster images to 3-D object surfaces during resolution dependent 3-D rendering is known and described by, for example, Foley, et al. Similarly, mapping of 2-D vector images to 3-D object surfaces during resolution-independent 3-D rendering is known and is provided by, for example, Adobe Dimensions 2.0™ software. Graphic image creation would be further aided by computer graphics systems allowing precise mapping of 2-D raster images to resolution-independent 3-D renderings.

SUMMARY

In general, in one aspect, the invention features a method for rendering a 2-D resolution-dependent raster image mapped onto 3-D resolution-independent surface-modeled object surface. The method includes mapping the 2-D raster image to a portion of a 2-D parametric map of a 3-D object, rendering the 3-D object as a 2-D vector resolution-independent output, and mapping the mapped raster image from the 2-D parametric map to a 2-D output space.

Preferred embodiments of the invention include one or more of the following features. The method includes creating a 3-D parametric surface model of the object. The method includes using the 3-D parametric surface model to define a 2-D parametric representation of at least a portion of the surface of the object. The method includes clipping the 2-D vector output of the model according to the projected outline in the 2-D display space. The method includes displaying the 2-D parametric representation to a user. The method includes displaying a 2-D resolution-dependent raster image on the displayed parametric representation in response to user input. The method includes defining outline of the raster image by establishing an outline curve around the raster image. The raster image to be applied to the 3-D model is a portion of a larger raster image, and the outline defines the portion of the larger image that is to be applied. The outline curve is established automatically as the outline of the raster image as displayed on the parametric representation. The outline curve is established before the raster image is placed on the displayed parametric representation. The outline curve is established by an edge detection process applied by the user to the raster image. The outline curve is established by the user creating a mask on the raster image, the outline of the mask defining the outline curve. The method includes displaying orientation information on the display of the parametric representation of the surface. Displaying orientation information includes displaying marks selected from the group consisting of a silhouette curve showing a boundary of consistent-facing regions of the surface and a set of grid lines in two dimensions. The method includes integrating the clipped raster image with the 2-D vector output to generate a final output. The method includes mapping the raster image to the 3-D space of the model and projecting the mapped raster image to the 2-D display space, and clipping the projected raster image according to the projected outline in the 2-D display space. The method includes integrating the clipped raster image with the 2-D vector output to generate a final output. The method includes delivering the projected raster image, a clipping path made according to the projected outline, and the 2-D vector output to an output device having a print engine operating to render the 2-D vector output to device raster output. The output device is a PostScript language printing device.

In general, in another aspect, the invention features a computer program, residing on a computer-readable medium, having instructions for causing a computer to render a two-dimensional resolution-dependent raster image as applied to a three-dimensional surface modeled object, in accordance with the methods of the invention.

Among the advantages of this invention are the ability to map 2-D resolution dependent raster images onto 3-D resolution independent surface rendering thereby providing a high quality two-dimensional output. Additionally, the invention allows precise placement of 2-D raster images on the 3-D surfaces and provide a three-dimensional rendering method that is compatible with existing computer display and printing equipment. A further advantage of the present invention is a reduction in computer and printer memory required by high resolution images. The reduction of memory is realized by eliminating the rasterization of the 3-D vector part of the image before combining with the 2-D raster images.

Other features and advantages of the invention will become apparent from the following description and from the claims.

DETAILED DESCRIPTION

Figure 1A:
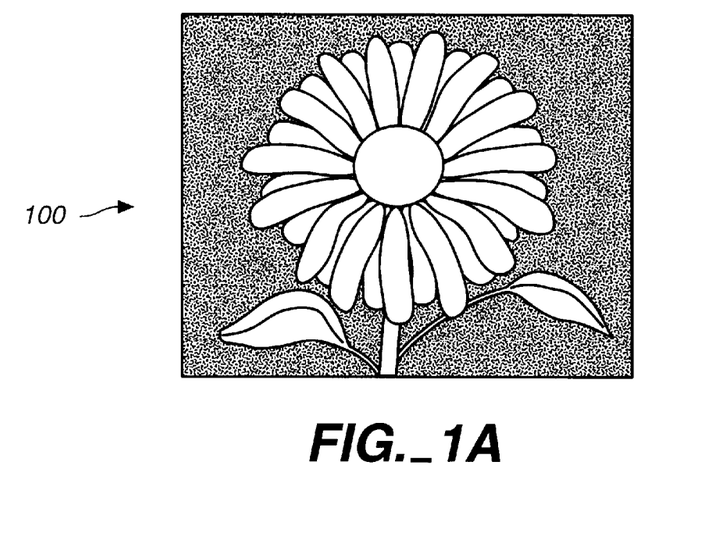
FIG. 1A is a two-dimensional raster image.
Figure 1B:
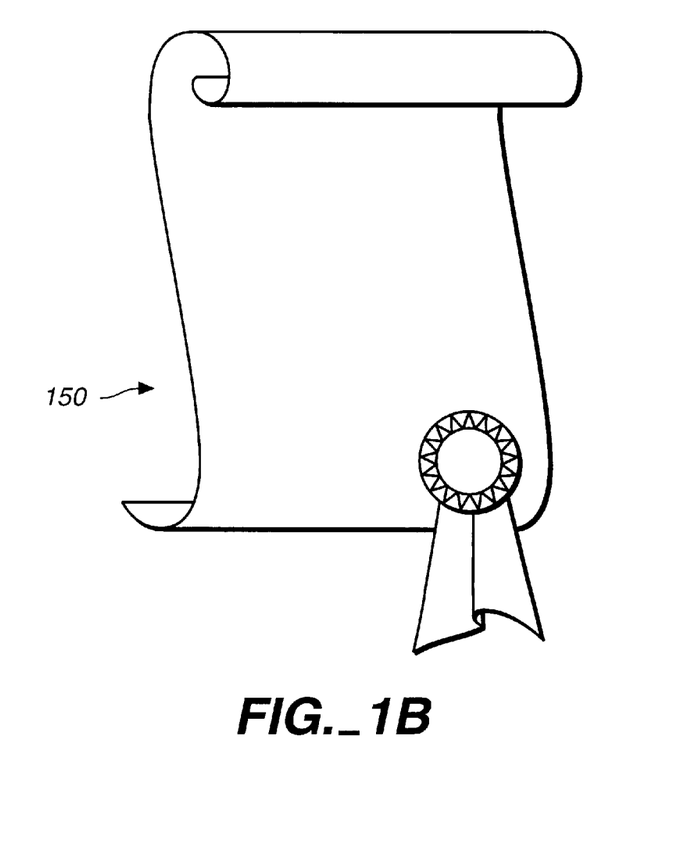
FIG. 1B is a two-dimensional vector image.

Referring to FIG. 1A, a two-dimensional (2-D) raster image 100 is shown. A raster image, such as image 100, consist of a grid, or raster, of discrete picture elements known as pixels. The grid is typically defined having discrete points along two orthogonal axes. Referring to FIG. 1B, a 2-D vector image 150 is shown. 2-D vector images are made up of mathematically defined lines, curves, and paths called vectors. 2-D vectors are typically defined on a pair of continuously defined orthogonal axes.

Figure 2A:
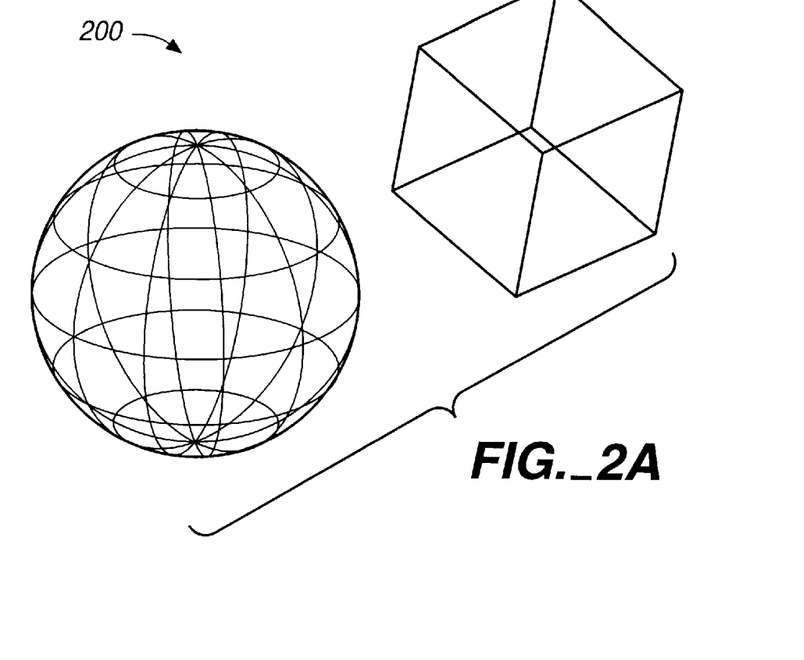
FIG. 2A is a wire frame representation of a 3-D sphere and a 3-D cube.
Figure 2B:
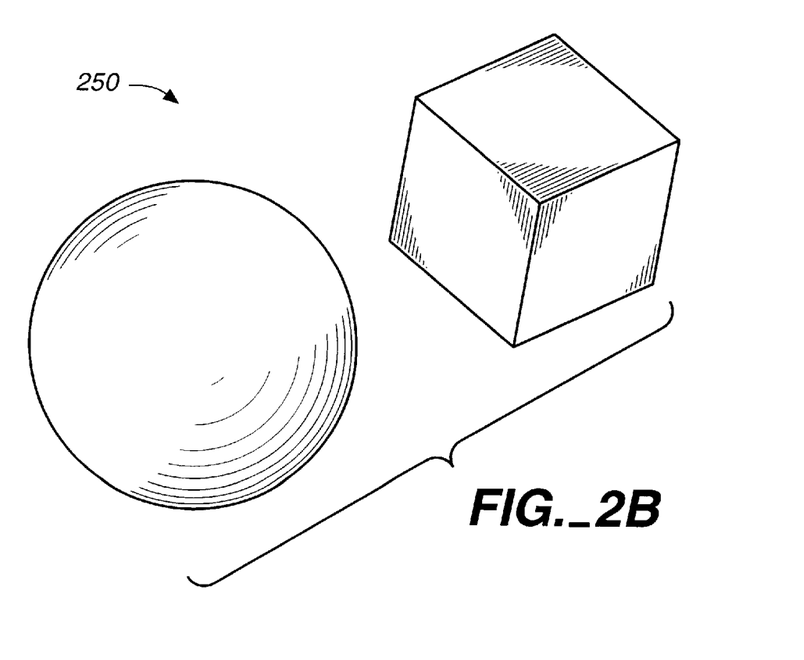
FIG. 2B is a rendered view of the objects in FIG. 2A.

Referring to FIG. 2A, a "wire frame" view 200 of a 3-D model is illustrated. The view 200 shows 3-D object surfaces and relative object positions. Referring to FIG. 2B, a "rendered" view 250 of a 3-D model may also be displayed. In a rendered view, surface features such as surface color and shading may be displayed.

Figure 3:
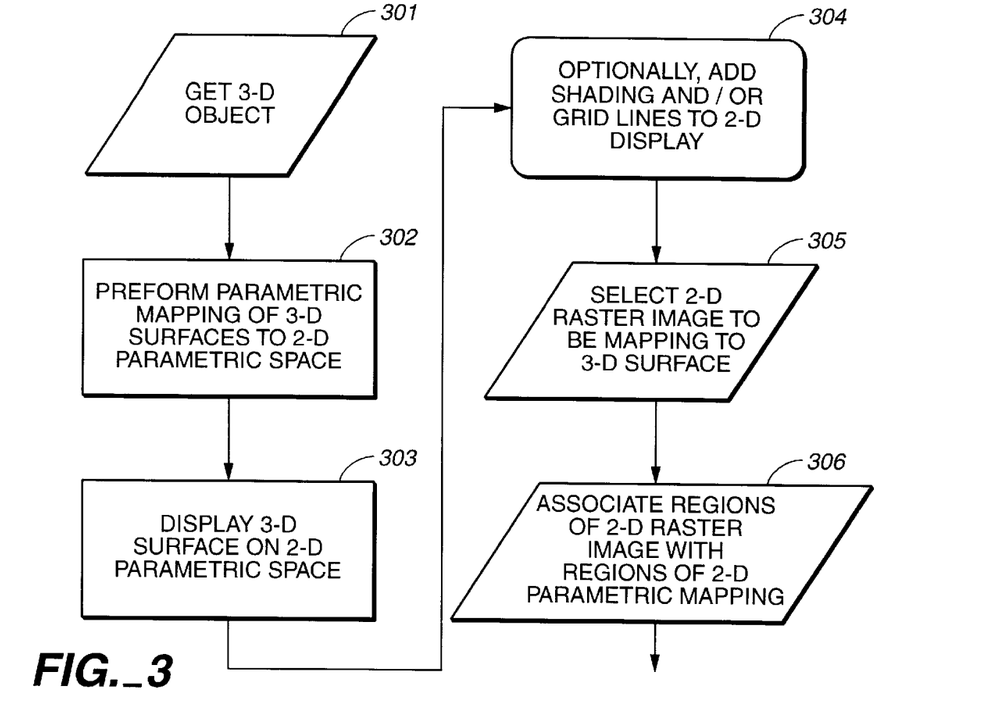
FIG. 3 is a flowchart of a computer program implementation of the method of the invention.
Figure 5:
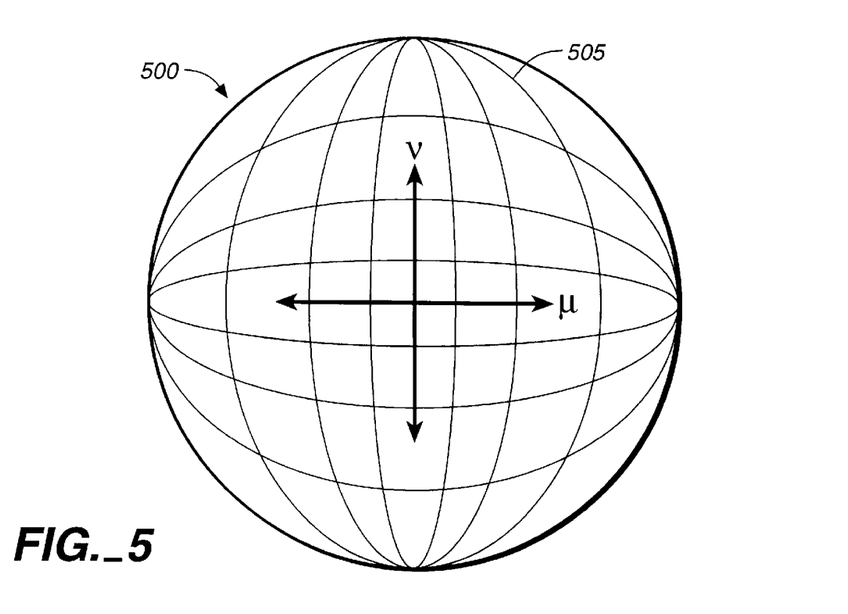
FIG. 5 is a 3-D object with Indicated Parametric Space Mapping paths u and v.

Referring to FIGS. 3 and 5, in an illustrative computer program implementation of a 3-D modeling and drawing program, the method of the invention begins in step 301 with the input of a 3-D object 500 that has surfaces defined in 3-D modeling space along, for example, coordinates (x, y, z). The object 500 may be input from a computer hard disk or other storage media or may be created by a user of the modeling program. Next, in step 302, all or a selected portion of the surfaces of the 3-D object are mapped from three-dimensional space back to points in two-dimensional parametric space.

Figure 6:
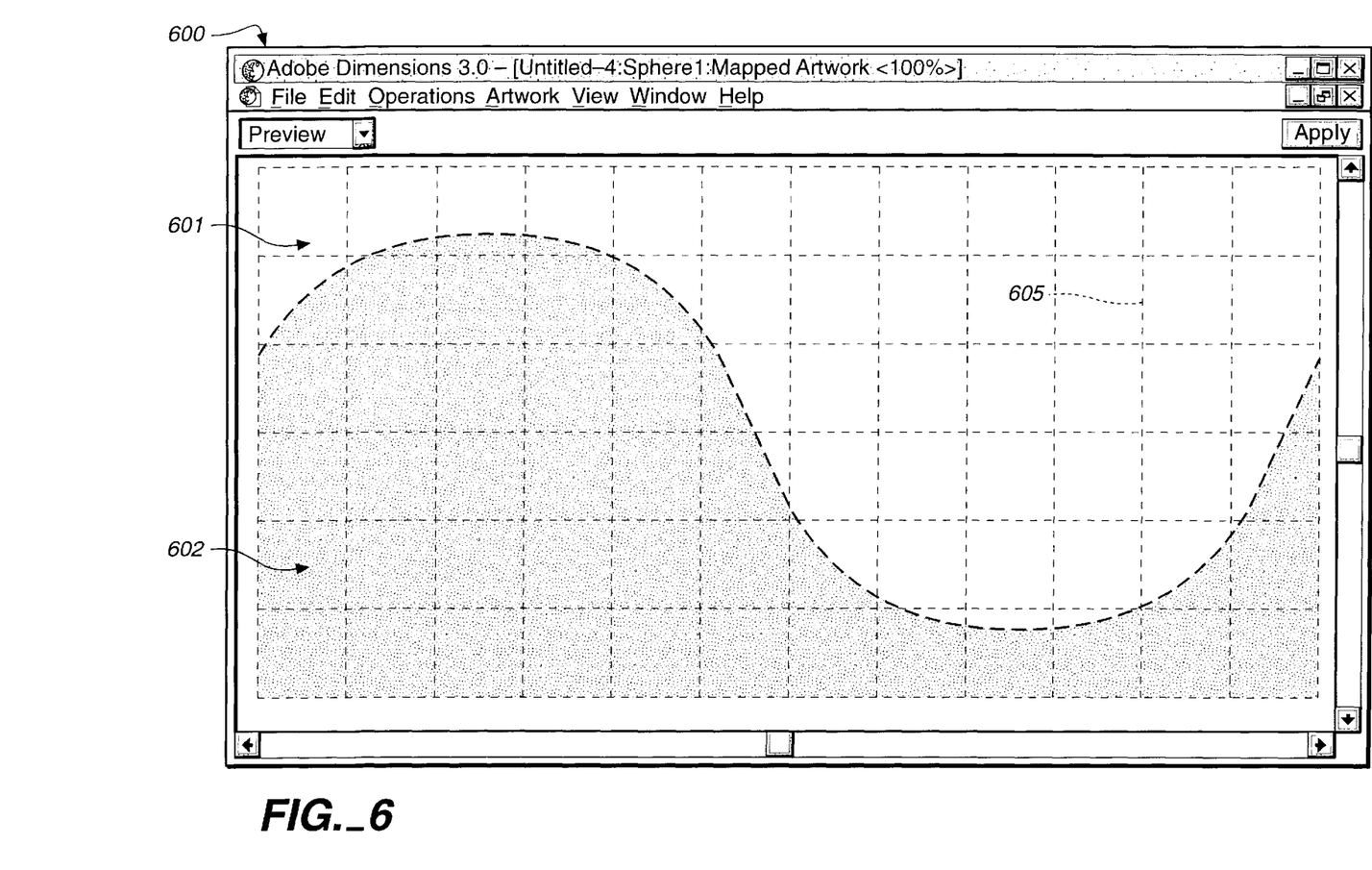
FIG. 6 is a Parametric Space Mapping of the Sphere of FIG. 5.

The mapping of the surface of an object in 3-D space to 2-D space is known as a parametric space mapping. A parametric space mapping relates coordinates along a continuously defined 3-D surface to coordinates in two-dimensional space. Referring to FIGS. 5 and 6, to perform the parametric space mapping of the object 500, a (two-dimensional parametric space 600 with axes (u, v) is defined. Points in the defined parametric space 600 may be associated with points on the 3-D object 500 by defining corresponding parameters (u, v) on the surface of the 3-D object 500. Mapping from points in the 2-D (u, v) parametric space to surfaces defined in 3-D space along coordinates (x, y, z) is performed using a mapping function $f$ defined such that $(x, y, z)=f(u, v)$. This function is reversible using the inverse function $f^1$ such that $(u, v)=f^1(x, y, z)$, thereby allowing points to be mapped from the 3-D surface back to the 2-D parameter space.

For example, still referring to FIGS. 5 and 6, a parametric space mapping of a sphere 500 relative to a rectangular two-dimensional coordinate system may be created by defining u and v along the surface of the sphere 500 such that u and v form orthogonal paths on the surface. Using the defined u and v paths, the curved surfaces of the sphere is mapped to a two-dimensional parametric space 600. Note that although the illustrated mapping has a rectangle parametric space mapping 600, alternative parametric space mapping functions may be advantageously employed yielding non-rectangular mapping spaces. Familiar examples from cartography include cylindrical, pseudo-cylindrical, conic, and azimuthal mappings. Mapping may be based on tables of coordinates, rather than a formula, such as in the Robinson cartographic projection.

As indicated in Step 304, a two-dimensional parametric space may include optional display features indicating 3-D model characteristics. For example 3-D models have forward facing surfaces that are visible from a particular viewpoint and have backward facing surfaces that are not visible from the viewpoint. Forward and backward facing surfaces may be indicated in the displayed 3-D parametric surface mapping by the use of a silhouette function. A silhouette function applies predetermined colors or patterns to distinguish the backward and forward facing surfaces. Referring to FIG. 6, the backward facing surfaces of sphere 500 are represented by a gray silhouette 602 and the forward facing surfaces are represented without shading 601. Additionally, the 3-D model and the 2-D parametric space may include grid lines to aid in the accurate placement of 2-D raster images on the surface of the 3-D model, for example grid line 505 in FIG. 6 and grid line 605 in FIG. 5.

Figure 7:
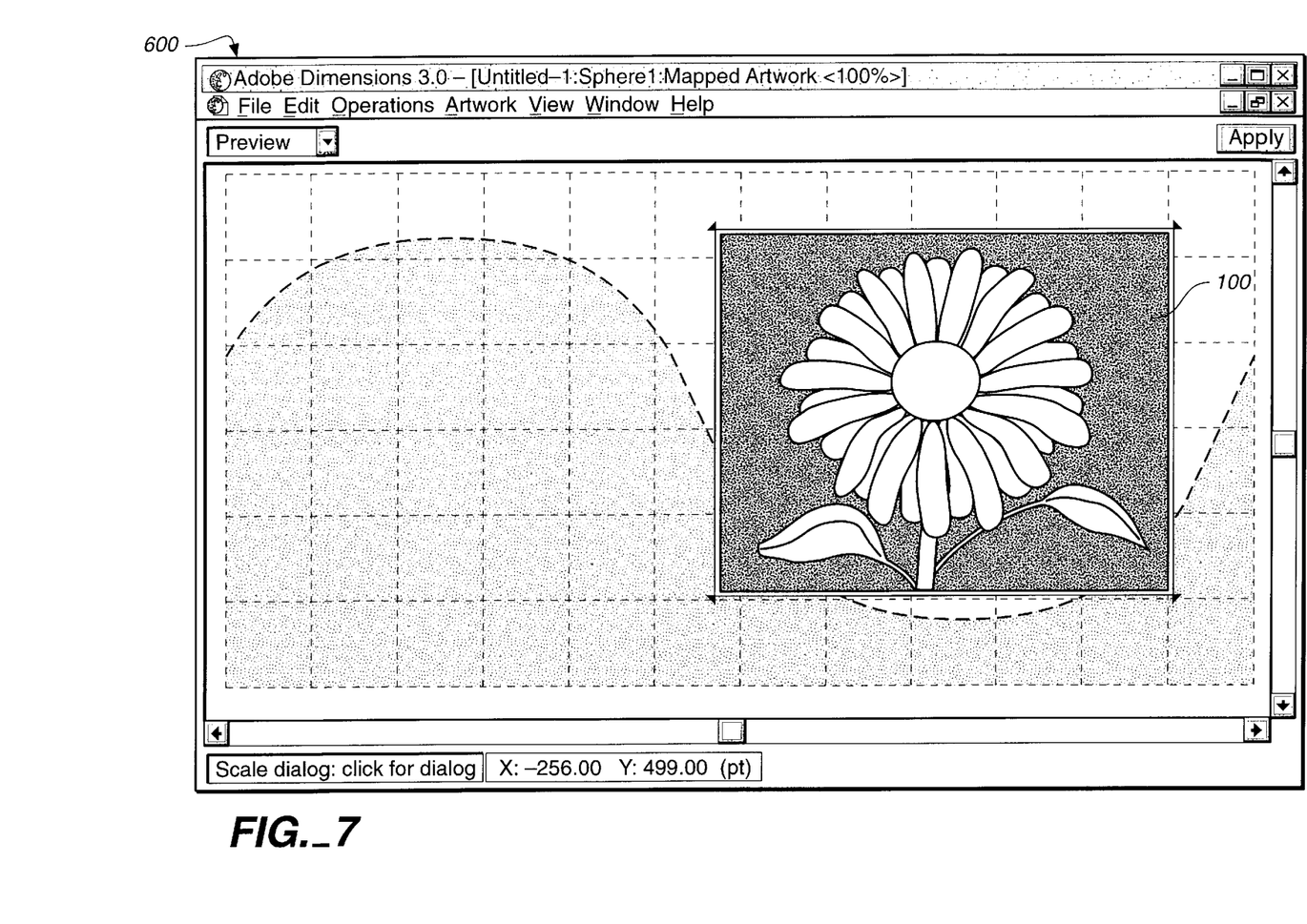
FIG. 7 illustrates a 2-D raster image of a leaf being associated with parametric space areas by dragging the leaf image onto portions of the parametric space.

Referring to FIGS. 1, 3 and 7, in step 305 of the method, a 2-D raster image 100 that is to be mapped to the 3-D surface 500 is selected. The two-dimensional raster image 100 may optionally be shown in a separate graphic user interface window. Subsequently, in step 306, the user designates the mapping of the 2-D raster image 100 to the surface of the 3-D model by associating regions of the 2-D raster image with regions of the parametric space 600. Using a conventional graphical user interface, this association of regions may be accomplished by using a computer pointing device, such as a mouse, to move displayed sections of the raster image over displayed sections of the parametric space. This is illustrated in FIG. 7 in which a raster image 100 (See FIG. 1 description of the raster image) is placed on the parametric space of the sphere 500, thereby invoking software functionality to associate the 2-D raster image 100 with the parametric space sections the raster image covers.

Figure 4:
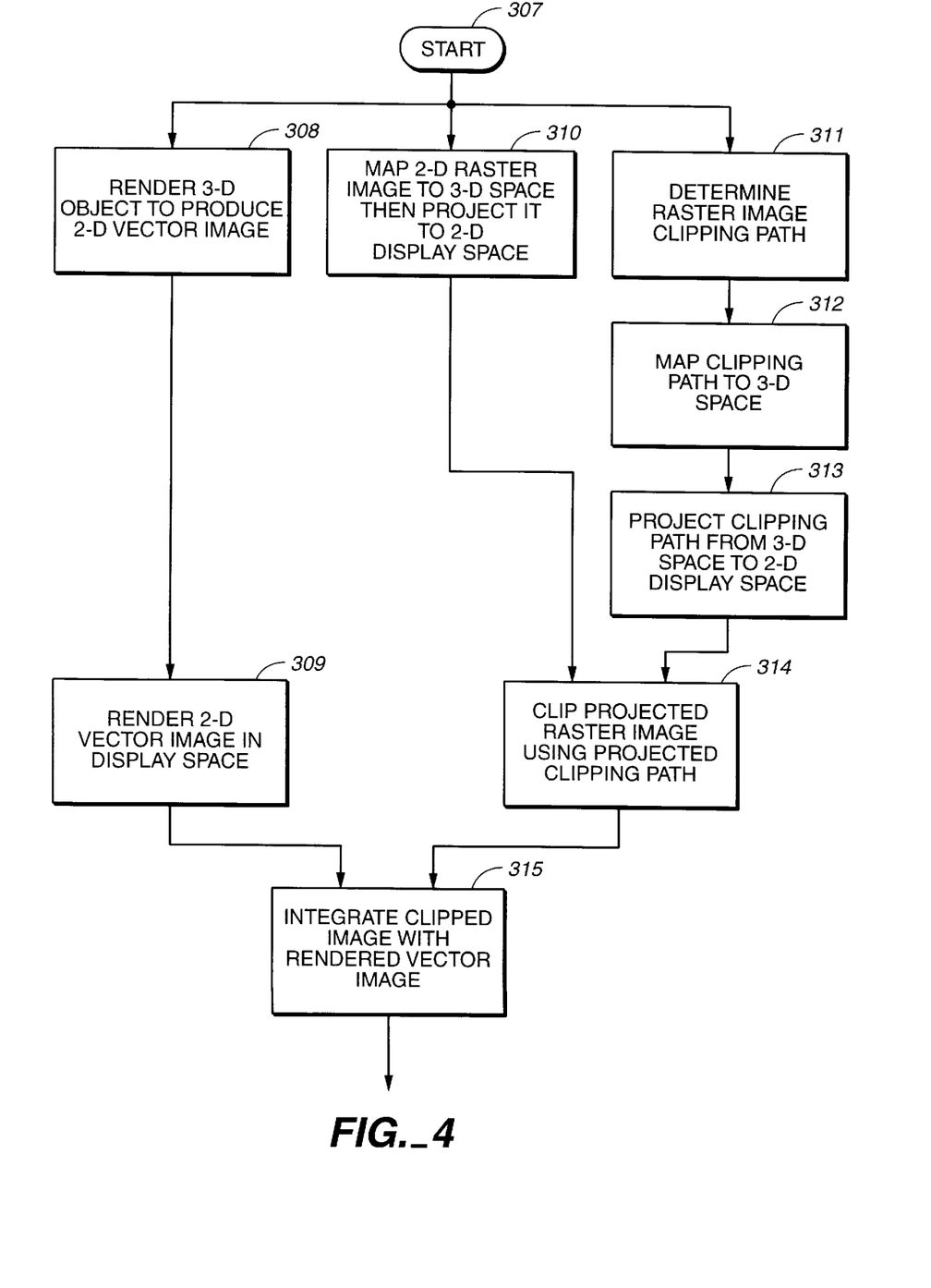
FIG. 4 is a detailed flowchart of a computer program implementation of the rendering step of the method of the invention.

Referring now to FIG. 4, in Step 307, mapping of the raster image and rendering of the 3-D image begins. In step 308, a 3-D rendering of the object 500 produces a resolution independent 2-D vector image of the object as viewed from a particular point in 3-D space. During this rendering step, shading may be applied to the surfaces of the object in known fashion. Subsequently, in step 309, the 2-D vector image produced by step 308 is mapped to discrete display space coordinates (x', y').

Additionally, the raster image is mapped from parametric space back to display space. Mapping of the raster image from parametric space to display space begins in step 310. In step 310, the raster image 100 is mapped from (u, v) space to three dimensional space (x, y, z) by the parametric space mapping functions Optionally, the raster image, as projected in 3-D space may have surface details such as shading and bump mapping applied. Shading and bump mapping methods is described by, for example, Foley, et al., and is represented herein by the function D(x, y, z). The projected and optionally shaded surface is subsequently projected from (x, y, z) space to output device space (x', y') by the device space mapping function (x', y')=g(x, y, z). Thus, a complete raster image mapping from 2-D parametric space to discrete output device coordinates may be represented by the mapping function $$(x', y')=g(D(f(u, v)))$$

applied to raster image points on the (u, v) mapping.

In step 314, a clipping path may optionally be applied to the raster image projection of step 310. Application of a clipping path to the projected raster image improves the sharpness of the projected raster image's edges and enables precise alignment of raster image edges on surfaces of the rendered 3-D model.

Determination of the clipping path begins in step 311. In step 311, the clipping path is determined with reference to the placement of the raster image in (u, v) parametric space. This clipping path may be determined by, for example, a software program module or a separate software program such as the Adobe Streamline™ program. Alternatively, the clipping path can be determined by user input such as by the user inputting a clipping path using a graphical computer interface and a pointing device such as a mouse. Next, in step 312, the clipping path as determined in (u, v) space is projected from (u, v) space to 3-D space (x, y, z) and, in step 210, from the 3-D space to display space coordinates (x', y').

Figure 8A:
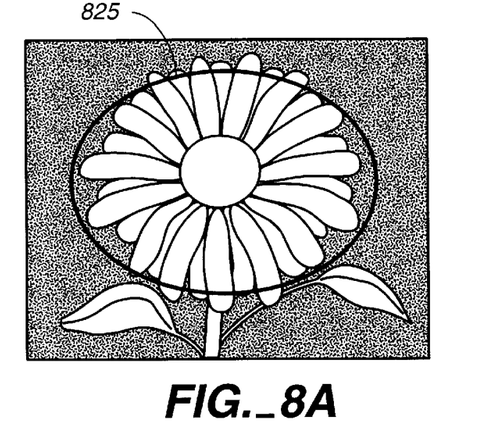
FIGS. 8A and 8B illustrate the application of a clipping path to a raster image.
Figure 8B:
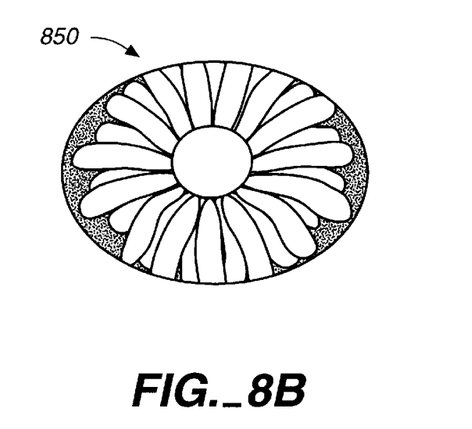

For illustrative purposes, application of an oval clipping path to a raster image is shown in FIGS. 8A and 8B. In FIG. 8A an oval clipping path 825 is defined on a raster image 100. As seen in FIG. 8B, application of the clipping path 825 to the image 100 results in an oval shaped raster image 850.

Figure 9A:
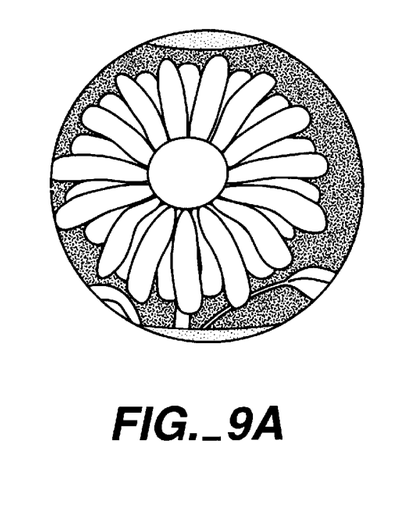
FIGS. 9A and 9B illustrates a rendering of a 2-D raster image and a 3-D vector image, as viewed from two different points in 3-D space, according to the invention.
Figure 9B:
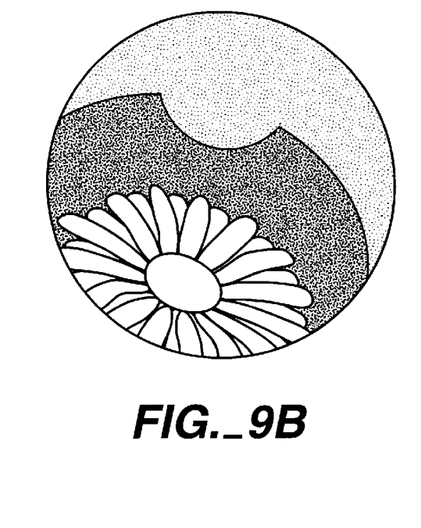

The method completes in step 315 wherein the rendered 2-D vector image produced in step 309 is combined with the raster image output from step 314 and displayed. Sample images produced according to the invention are shown in FIGS. 9A and 9B. These images illustrate a sample raster image 100 mapped to a 3-D surface 500 as viewed from differing points in 3-D space.

In a preferred approach, steps 308, 310, and 313 produce output in the PostScript™ page description language. Steps 309, 314, and 315 may then performed by a PostScript™ interpreter in, for example, a laser printer. Use of PostScript™ permits a clipping path to be defined in a resolution-independent manner with clipping path edges that accurately correspond to the edges of the 3-D vector model.

The described method allows precise placement of separately defined 2-D raster image graphics art on the surfaces of models. Two-dimensional graphics art might, for example, include a label designed for a bottle, which is subsequently applied to the modeled surface of the bottle for rendering as a combined three-dimensional image.

Figure 10:
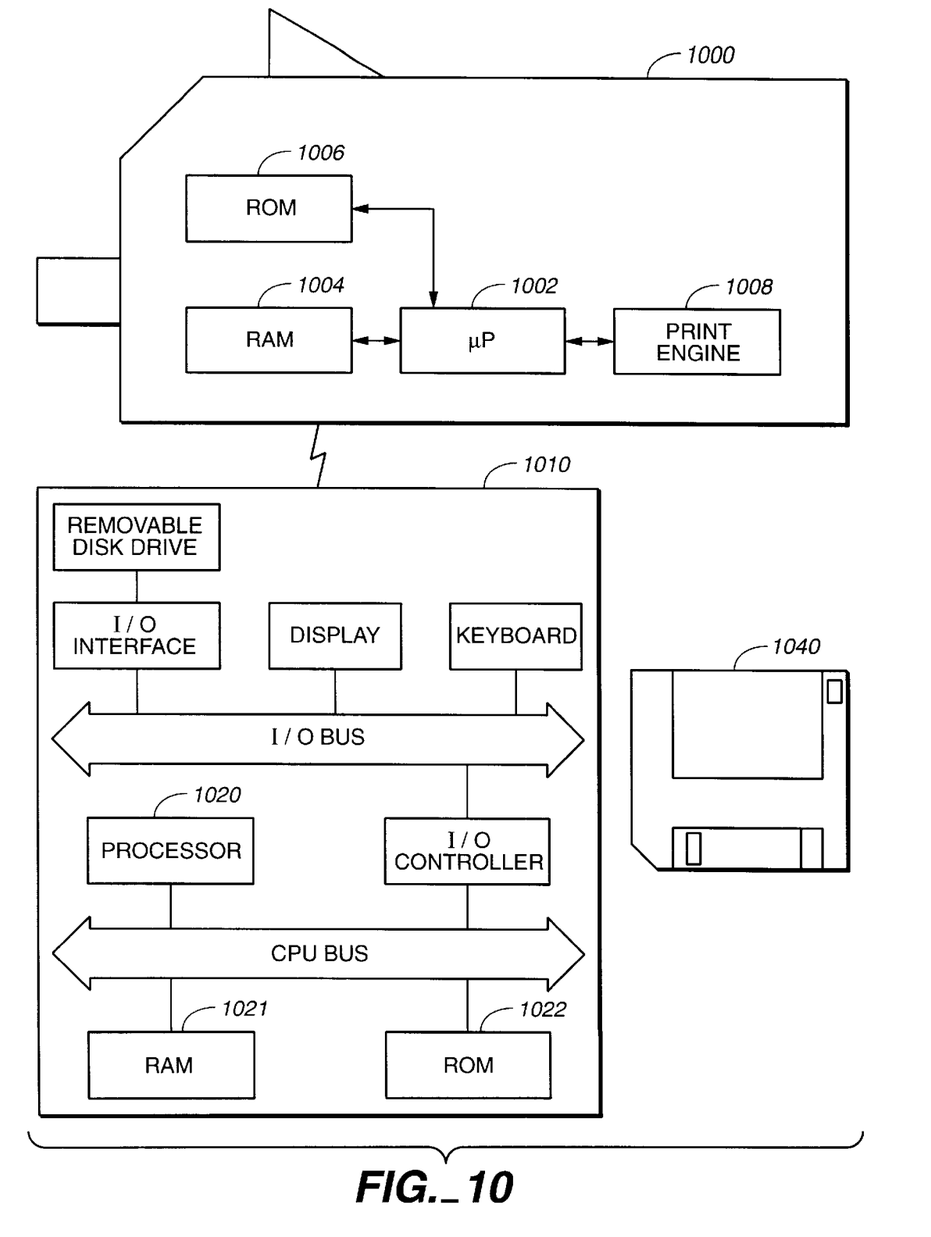
FIG. 10 illustrates a computer and computer elements suitable for implementing the invention.

Referring to FIG. 10, the invention may be implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output. Suitable processors 1020 include, by way of example, both general and special purpose microprocessors. Generally, a processor will receive instructions and data from a read-only memory 1022 and/or a random access memory 1021. Storage devices suitable for tangibly embodying computer program instructions include all forms of non-volatile memory, including by way of example semiconductor memory devices, such as EPROM, EEPROM, and flash memory devices; magnetic disks such as internal hard disks and removable disks 1040; magneto-optical disks; and CD-ROM disks. Any of the foregoing may be supplemented by, or incorporated in, specially-designed ASICs (application-specific integrated circuits).

By way of example, a printing device 1000 implementing an interpreter for a page description language, such as the PostScript® language, includes a microprocessor 1002 for executing program instructions stored on a printer random access memory (RAM) 1004 and a printer read-only memory (ROM) 1006 and controlling a print marking engine 1008. The RAM 1004 is optionally supplemented by a mass storage device such as a hard disk or high-capacity removable disk (not shown). The essential elements of a computer are a processor for executing instructions and a memory. A computer can generally also receive programs and data from a storage medium such as an internal disk (not shown) or a removable disk 1040. These elements will be found in a conventional desktop or workstation computer 1010 as well as other computers suitable for executing computer programs implementing the methods described here, which may be used in conjunction with any digital print engine or marking engine, display monitor, or other raster output device capable of producing color or gray scale pixels on paper, film, display screen, or other output medium.

It should be understood that the foregoing description is only illustrative of an embodiment of the invention. Other embodiments are within the scope of the following claims.

What is claimed is:

1. A method for rendering a 2-D resolution-dependent raster image applied to a 3-D surface-modeled object, comprising:

mapping a 2-D raster image to a portion of a 2-D parametric map of a 3-D object;

rendering the 3-D surface as a 2-D vector resolution-independent output; and mapping the mapped raster image from the 2-D parametric map to the 2-D vector resolution-independent output.

2. The method of claim 1, further comprising:

creating a 3-D parametric surface model of the object;

using the 3-D parametric surface model to define a 2-D parametric representation of at least a portion of the surface of the object;

displaying the parametric representation to a user;

displaying a 2-D resolution-dependent raster image on the displayed parametric representation in response to user input; and rendering the 3-D model without the raster image to generate a 2-D vector output of the model.

3. The method of claim 1, further comprising:

mapping an outline of the mapped raster image from the 2-D parametric representation to 3-D space and projecting the mapped outline to 2-D display space; and clipping the 2-D vector output of the model according to the projected outline in the 2-D display space.

4. The method of claim 3 further comprising:

defining outline of the raster image by establishing an outline curve around the raster image.

5. The method of claim 4 wherein the raster image to be applied to the 3-D model is a portion of a larger raster image, and the outline defines the portion of the larger image that is to be applied.

6. The method of claim 4 wherein the outline curve is established automatically as the outline of the raster image as displayed on the parametric representation.

7. The method of claim 4 wherein the outline curve is established before the raster image is placed on the displayed parametric representation.

8. The method of claim 4 wherein the outline curve is established by an edge detection process applied by the user to the raster image.

9. The method of claim 4 wherein the outline curve is established by the user creating a mask on the raster image, the outline of the mask defining the outline curve.

10. The method of claim 2 further comprising:

displaying orientation information on the display of the parametric representation of the surface.

11. The method of claim 10 wherein displaying orientation information includes displaying marks selected from the group consisting of a silhouette curve showing a boundary of consistent-facing regions of the surface and a set of grid lines in two dimensions.

12. The method of claim 2 further comprising:

integrating the clipped raster image with the 2-D vector output to generate a final output.

13. The method of claim 2 further comprising:

mapping the raster image to the 3-D space of the model and projecting the mapped raster image to the 2-D display space; and clipping the projected raster image according to the projected outline in the 2-D display space.

14. The method of claim 12 further comprising:

integrating the clipped raster image with the 2-D vector output to generate a final output.

15. The method of claim 12 further comprising:

delivering the projected raster image, a clipping path made according to the projected outline, and the 2-D vector output to an output device having a print engine operating to render the 2-D vector output to device raster output.

16. The method of claim 14 where the output device is a PostScript language printing device.

17. A computer program, residing on a computer-readable medium, comprising instructions for causing a computer to:

receive a 3-D parametric surface model of the object;

use the 3-D parametric surface model to define a 2-D parametric representation of at least a portion of the surface of the object;

display the parametric representation to a user;

display a 2-D resolution-dependent raster image on the displayed parametric representation in response to user input;

render the 3-D model without the raster image to generate a 2-D vector resolution-independent output of the model;

clip the raster image;

combine the 2-D vector resolution-independent output of the model with the clipped raster image; and project to 2-D display space.

* * * * *

UNITED STATES PATENT AND TRADEMARK OFFICE
CERTIFICATE OF CORRECTION

PATENT NO. : 6,124,858
DATED : September 26, 2000
INVENTOR(S) : Grace Ge et al.

It is certified that error appears in the above-identified patent and that said Letters Patent is hereby corrected as shown below:

<u>Title page,</u>
Item [56], References Cited,
U.S. PATENT DOCUMENTS, replace "Verchione" with -- Vecchione --.
OTHER PUBLICATIONS, replace "nov. 1986" with -- Nov. 1986 --.
OTHER PUBLICATIONS, replace "Hiden" with -- Hidden -- and "Ssurfaces" with -- Surfaces --.

<u>Column 1,</u>
Line 10, replace "creates" with -- create --.

<u>Column 4,</u>
Line 15, replace "a (two" with -- a two --.
Line 24, replace "function $f^1$" with -- function $f^{-1}$ --.
Line 24, replace "$f^1(x, y, z)$" with -- $f^{-1}(x, y, z)$ --.
Line 58, replace "505 in FIG 6" with -- 505 in FIG 5 --.
Line 58, replace "605 in FIG 5" with -- 605 in FIG 6 --.

<u>Column 5,</u>
Line 23, replace "functions" with -- function $f$.--.

<u>Column 6,</u>
Line 3, insert -- be -- after "then".

Signed and Sealed this

Fourth Day of February, 2003

JAMES E. ROGAN
*Director of the United States Patent and Trademark Office*